United States Patent [19]

Korpman

[11] 3,932,328

[45] Jan. 13, 1976

[54] HOT MELT ADHESIVE COMPOSITION AND TAPE

[75] Inventor: Ralf Korpman, Somerville, N.J.

[73] Assignee: Johnson & Johnson, New Brunswick, N.J.

[22] Filed: Oct. 17, 1973

[21] Appl. No.: 407,331

Related U.S. Application Data

[63] Continuation of Ser. No. 195,015, Nov. 2, 1971, abandoned.

[52] U.S. Cl.... 260/27 BB; 260/27 R; 260/33.6 AQ; 260/876 B; 260/880 B; 428/355; 428/512

[51] Int. Cl.² .................. C08K 5/01; C08L 53/02; C08L 93/04; C09J 7/04

[58] Field of Search...... 260/27 R, 27 BB, 33.6 AQ, 260/876 B, 880 B; 117/122; 428/355, 512

[56] References Cited
UNITED STATES PATENTS

| | | | |
|---|---|---|---|
| 3,239,478 | 3/1966 | Harlan | 260/27 R |
| 3,325,430 | 6/1967 | Grasley | 260/27 BB |
| 3,577,398 | 5/1971 | Pace | 260/879 |
| 3,632,540 | 1/1972 | Unmuth | 260/27 R |
| 3,649,579 | 3/1972 | Gobran | 260/27 R |
| 3,736,281 | 5/1973 | Russell | 260/27 R |

Primary Examiner—Donald E. Czaja
Assistant Examiner—H. H. Fletcher

[57] ABSTRACT

A hot melt pressure-sensitive adhesive composition and tape wherein the adhesive comprises an elastomeric component based on an elastomeric and thermoplastic A-B-A block copolymer wherein the B blocks are derived from isoprene and the A blocks are derived from styrene, and a unique tackifier component based on a blend of solid and liquid tackifier resins. The elastomeric and tackifier components are combined in specific proportions, as are the solid and liquid tackifier resins in the tackifier component. Preferred solid and liquid tackifier resins are disclosed.

5 Claims, No Drawings

HOT MELT ADHESIVE COMPOSITION AND TAPE

This is a continuation of my co-pending application Ser. No. 195,015 filed Nov. 2, 1971, and now abandoned.

The present invention relates to solvent-free hot melt pressure-sensitive adhesive compositions and to normally tacky and pressure-sensitive adhesive tapes made therefrom.

Conventional hot melt adhesives are those which are applied to substrates in the form of a liquid melt which solidifies on cooling and normally is not tacky and pressure-sensitive after application.

The coating of solvent-free pressure-sensitive adhesives has been a long felt goal of the adhesive tape industry. The elimination of solvent removes a fire hazard, lowers cost substantially and eliminates the problem of air pollution.

One approach has been to calendar the adhesive without solvent, but this requires extremely precise and expensive equipment which also is costly to maintain. Furthermore, this method of coating is not satisfactory for applying very thin adhesive layers.

Prior attempts to formulate solvent-free hot melt pressure-sensitive adhesives have not been satisfactory in that the adhesives invariably have had very poor performance characteristics. For instance, these adhesives had low hold properties and low plasticities and have been extremely temperature sensitive. The low plasticity of these adhesives resulted in roll deformation, i.e., telescoping, gapping and gearing, on aging of tape rolls made therefrom.

U.S. Pat. No. 3,239,478 discloses a new type of adhesive comprising an elastomeric and thermoplastic A-B-A block polymer, a solid tackifier resin and an extender oil. Although this adhesive is said to be capable of formulation as a hot melt adhesive at high oil contents, the resulting product also possesses very poor properties and is unsatisfactory as a pressure-sensitive adhesive for most applications.

I have discovered that, contrary to the teachings of U.S. Pat. No. 3,239,478, I can formulate a superior solvent-free hot melt pressure-sensitive adhesive composition by combining an elastomeric component based on one particular type of elastomeric and thermoplastic A-B-A block copolymer with a unique tackifier component based on a blend of solid and liquid tackifier resins within a specific range of proportions of tackifier component to elastomeric component; provided that the formulation is substantially free of any extender oil or similar oily extending material. The adhesive of my invention is formulated in such a way that about 125–300 parts, preferably 140–200 parts of the tackifier component are present in the adhesive per 100 parts of the elastomeric component; and preferably possesses a Brookfield Viscosity at 350° F. of about 10,000–75,000 and a Williams Plasticity at 150° F. of at least about 1.75 mm.

The unique hot melt adhesive of my invention, not only possesses the aforesaid relatively high Williams Plasticity, but also ages well, and exhibits very acceptable quickstick, hold and other performance characteristics. Furthermore, my adhesive can readily be applied with conventional hot melt application equipment at relatively low cost and at high speeds. Solvent costs and air pollution are eliminated.

The A-B-A block copolymer useful in the elastomeric component of this invention comprises an elastomeric B-block (center block) derived from isoprene, i.e., polymerized from isoprene either alone or in conjunction with a small proportion of other monomers; and thermoplastic A-blocks (end blocks) derived from styrene, i.e., polymerized from styrene or styrene homologues. The individual A-blocks have a number average molecular weight of at least about 7,000 preferably in the range of about 12,000 – 30,000, and the A-blocks constitute about 8–35 and preferably about 12–25 percent by weight of the block copolymer. The above described A-B-A block copolymer may be used as the sole elastomeric constituent of the adhesive, and it is preferred that the elastomeric component consist essentially of this type of block polymer. However, the elastomeric component of the adhesive may include a small proportion by weight of an additional more conventional diene elastomer such as natural rubber, or polymers based on butadiene, isoprene, butadiene-styrene (SBR rubber), butadiene-acrylonitrile (NBR rubber), butyl rubber, or the like, and also may include other block polymers based on such diene elastomers.

According to my invention, the solid and liquid tackifier resins are blended in such a way that the proportion of solid to liquid tackifiers in the tackifier component ranges between about 4 to 1 and 1 to 3, preferably 2.5 to 1 and 1 to 1. Solid tackifier resins are those which are friable or brittle at room temperature, i.e., about 25° C., and normally have softening points above about 60° C., whereas liquid tackifier resins are liquid at room temperature, or about 25° C., under otherwise normal ambient conditions. Preferably, the solid tackifier resins possess a number average molecular weight above about 900 and the liquid tackifier resins possess a number average molecular weight below about 700.

Liquid tackifier resins for the purposes of this invention are materials generally selected from the group consisting of liquid hydrocarbon resins, liquid polyterpenes, liquid rosin esters, liquid polystyrene resins, and the like. The solid tackifier resins are of the type listed in Column 5 of U.S. Pat. No. 3,239,478 and include rosin and rosin derivatives, polyterpenes, coumarone indenes, hydrocarbon resins, and the like. In this connection, it should be noted that the rosin esters listed in that patent are solids as are all of the tackifier resins referred to therein.

A preferred tackifier component according to this invention comprises a blend of similar solid and liquid hydrocarbon resins of a particular type. These preferred resins are polymerized from a stream of aliphatic petroleum derivatives in the form of dienes and mono-olefins having 5 or 6 carbon atoms generally in accordance with the teachings of U.S. Pat. No. 3,577,398. The resulting solid hydrocarbon resin consists essentially of polymerized structures derived from these aliphatic dienes and mono-olefins of 5 or 6 carbon atoms and since the dienes are more reactive, at least 40 percent by weight and preferably a major proportion of said structures are derived from the dienes. In this type of resin, the dienes are piperylene and/or isoprene. However, in some formulations, the percentage of isoprene is extremely low. In the solid resin of this embodiment the molecular weight may range between about 900 and 1300 with the mean number average molecular weight being about 1100. This solid resin also has a softening point in the neighborhood of 100° C. In one preferred form, i.e., Wingtack 95 offered by Goodyear Chemical Company, the softening point is 95° C.

The preferred liquid hydrocarbon tackifier resin of this embodiment of the invention also consists essentially of polymerized structures derived from aliphatic dienes and mono-olefins of 5 or 6 carbon atoms, at least 40 percent by weight and preferably a major proportion of which are derived from piperylene or from piperylene and isoprene. However, this resin is liquid at 25° C. and has a number average molecular weight of about 500–600, i.e., in Resin W, referred to herinafter in the Examples, the number average molecular weight is 530. This liquid resin also contains a higher percentage of structures derived from the dienes piperylene and/or isoprene, i.e., in the neighborhood of 75% or more by weight of the resulting resin. Similarly, in the liquid resin, the amount of unsaturation is considerably higher. For instance, with the unsaturation expressed in percentage of polymerized units in each molecule having a double bond as compared with the total number of units in a molecule, the solid resin normally only will have about 10–15% or slightly more unsaturation, whereas the liquid resin may have over 25% unsaturation.

This invention also contemplates that conventional additives may be used in the adhesive formulation for various purposes. For instance, antioxidants such as 2,5 ditertiary amyl hydroquinone and tertiary butyl cresol may be used, as may conventional heat stabilizers such as the zinc salts of alkyl dithiocarbamates. Ultra-violet absorbers also may be added to the adhesive when improved outdoor weathering is required. Conventional inorganic fillers, pigments and coloring agents such as zinc oxide, aluminum hydrate, carbon black, clay, calcium carbonate, titanium dioxide and others may be used to extend the adhesive and alter its appearance or physical properties.

There are various methods of mixing the ingredients of the hot melt pressure-sensitive adhesive composition of this invention and coating the composition onto a flexible backing to form a pressure-sensitive adhesive tape. Since the block copolymer of this invention, in its preferred form, is particulate, one method is to thoroughly blend the dry block polymer particles with the solid tackifier resin particles, charge the dry blend into the inlet of an extruder and then pump the liquid tackifier into the extruder barrel where the formulation will be completely mixed. The opposite approach is to form a hot melt of the solid and liquid resins, i.e., to melt the solid resin particles with the liquid resins and maintain the melt at a temperature of approximately 175° C., and then add the block copolymer in the form of small particles which are thoroughly mixed in the resin melt. Another method is merely to place all the ingredients in a vessel and heat the contents at a low temperature, i.e., about 120° C. for 24 hours. At the end of the 24 hour period the temperature of the ingredients can be raised to approximately 175° C. to reduce their viscosity and allow them to be stirred to form a thorough mixture in accordance with this invention.

Similarly, there are a number of methods which may be employed to coat the resulting hot melt pressure-sensitive adhesive composition onto a flexible backing sheet to form a pressure-sensitive sheet or tape. For instance, coating techniques such as hot reverse roll coating, hot gravure coating and hot knife coating may be employed. Furthermore, these techniques may be varied such as by using a hot roller or rod in place of a conventional blade in the so-called knife coating process. However, a preferred technique is to pump the hot melt composition through a hot die and then wipe the sheet over the die to pick up an adhesive layer of the desired weight or thickness. Generally speaking, the amount of adhesive applied to the sheet by this technique will depend upon the die opening and internal pressure and the speed of the sheet passing the die.

The resulting adhesive coated sheets and tapes of this invention are more than satisfactory for most applications. They possess satisfactory adhesive strength and high quickstick and perform quite satisfactorily in most applications at elevated temperatures. For instance, the adhesives and tapes of this invention will perform satisfactorily at temperatures up to 170° F. without offsetting of adhesive, a working temperature which is not possible with prior art hot melt adhesives which tend to offset above about 120° F. Other and further advantages of this invention will appear to one skilled in the art from the following examples and claims.

The following examples are given only by way of illustration and are not intended to limit the scope of the invention in any way. Table A gives the adhesive formulations for Examples I–V and the physical properties of pressure-sensitive adhesive tapes made therefrom. In the examples, all proportions are given in parts per 100 parts by weight of the elastomeric component unless otherwise shown.

TABLE A

| Material | I | II | III | IV | V |
| --- | --- | --- | --- | --- | --- |
| Kraton 1107 Elastomeric Component | 100 | 100 | 100 | 100 | 100 |
| Wingtack 95 Solid Tackifier | 120 | 100 | 100 | 100 | |
| Resin W Liquid Tackifier | 50 | 25 | 100 | 40 | |
| Foral 105 Solid Tackifier | | | | | 120 |
| Staybelite Ester No. 3 Liquid Tackifier | | | | | 50 |
| Zinc Dibutyl Dithiocarbamate | 2 | 2 | 2 | 2 | 2 |
| Ethyl 330 Antioxidant | 1 | 1 | 1 | 1 | 1 |
| Adhesion to Steel ozs/inch width | 47 | 43 | 34 | 40 | 42 |
| Quickstick | 6 | 9 | 11 | 9 | 7 |
| 20° Hold to Chrome (Hrs. & Min.) | 3:50 | 4:40 | 3:25 | 4:00 | 3:00 |
| Brookfield Viscosity (approx.) 350° F. | 40,000 | 90,000 | 34,000 | 60,000 | 25,000 |

In formulating the adhesives for examples I–IV, all of the ingredients except the Kraton 1107 are melted at 175° C. and then the Kraton 1107 elastomer is added in the form of small particles, i.e., substantially less than 5 millimeters in average cross dimension to form a dispersion in the melt. The resin and the elastomer then are thoroughly mixed and the resulting hot melt adhesive composition is forced through a die slot and wiped onto a unified creped paper backing sheet passing the die at a linear speed of approximately 600 feet per minute. The resulting product is cooled and then wound into rolls for storage. Rolls of pressure-sensitive adhesive tapes are formed from this coated sheet by slitting the sheet in accordance with conventional techniques. The adhesive formulation of Example V is mixed by placing all the ingredients into a kettle heated to 250° F. and letting them stand for approximately 24 hours. Then the heated blend is elevated to 350° F. and stirred for a short mixing cycle, i.e., 90 minutes to thoroughly mix the ingredients. The resulting composition then is hot knife coated onto a 1½ mil thickness film of polyethylene teraphthalate to form a pressure-sensitive adhesive sheet and the coated sheet is rolled up for storage and subsequently made into tapes as described for the foregoing examples.

In obtaining the physical properties listed in Table A, the adhesive strength or adhesion to steel is measured by peeling the tape backing over itself 180° at a constant speed (by a force applied to the free end of the tape) from a smooth steel surface to which it has been applied by a fixed pressure. For the techniques used in conducting this test, see the 180° peel adhesion test PSTC-1 of the Pressure Sensitive Tape Council.

Quickstick is measured by laying a length of tape, adhesive side up, upon a horizontal surface and then rolling a plastic ping pong ball down an incline onto the adhesive. The vertical height at which the ball starts and the distance the ball rolls along the tape before coming to rest is measured. Quickstick is reported as the height in inches raised to the three-halves power, divided by the distance rolled in inches. This ratio is found to be a constant for a given tape. The ball used is approximately 1 inch in diameter, and weighs approximately 2 grams. Its outer surface is carefully cleaned between each test.

20° Hold to chrome is measured at room temperature, i.e., 25° C. by noting the time in hours that it takes for a ½ inch wide strip of tape to be pulled from a chrome coated steel plate by a 400 gram weight attached to the bottom of the tape. For this purpose, a ½ inch length at the end of the tape is adhered to the chrome plate which is disposed at 20° to the vertical in such a way that the tape attached to the weight below the adhered portion makes a 20° angle with the plate.

Viscosity is measured with a Brookfield Viscometer, Moded LVF, using a No. 4 Spindel rotating at 60 r.p.m. in a Thermosel heater.

It should be noted that the tapes of each of Examples I-V possess excellent quickstick and good adhesion to steel and hold to chrome. Each tape also is capable of removal from a smooth surface without offsetting of adhesive after having been adhered to the surface for an extended period, such as while exposed to a temperature of approximately 75° C.

Kraton 1107 is a thermoplastic elastomeric A-B-A block polymer of this invention offered by the Shell Chemical Company, wherein the styrene content (that of the A blocks) is about 12–15%, closer to 15% by weight of the block polymer and the polymer possesses a solution viscosity of about 2000 centipoises at 25% solids in toluene at room temperature (using a Brookfield Viscometer with a No. 4 Spindle at 60 r.p.m.), and a number average molecular weight of about 110,000–125,000.

Wingtack 95 resin is a solid tackifier resin consisting predominantly of polymerized structures derived from piperylene and isoprene, with the ratio of piperylene to isoprene derived structures being at least about 8 or 9 to 1, and with the remainder being derived from mono-olefins. It appears to contain about 12–15 percent unsaturation based upon percentage of units in each molecule having a double bond. The said resin is polymerized from a stream of aliphatic petroleum derivatives in the form of dienes and mono-olefins having 5 or 6 carbon atoms all in accordance with the general teachings of the aforesaid U.S. Pat. No. 3,577,398. This resin possesses a softening point of about 95° C. by the ball and ring method, a number average molecular weight of about 1100 and is offered commercially by Goodyear Tire and Rubber Company.

Resin W is a liquid tackifier resin also consisting predominantly, i.e., about 75% of polymerized structures derived from piperylene and isoprene. However, this resin is liquid at 25° C. and has a number average molecular weight of about 530. It appears to have at least about 25% unsaturation, as explained hereinbefore. It also contains a lesser percentage of structures derived from mono-olefins and is offered commercially by Goodyear Tire and Rubber Company as liquid Wingtack Resin.

Foral 105 Solid Tackifier is the pentaerythritol ester of highly stabilized rosin having a melting point of 105° C. and is offered by the Resins Division of Hercules, Inc. Staybelite Ester No. 3 Liquid Tackifier is the diethylene glycol ester of hydrogenated rosin and is a viscous liquid at 25° C. It also is offered commercially by the Resins Division of Hercules, Inc. Ethyl 330 Antioxidant is 1,3,5-trimethyl-2,4,6-tris (3,5-di-tertiary butyl-4-hydroxy benzyl) benzene.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A substantially oil-free hot melt pressure-sensitive adhesive composition comprising an elastomeric component which comprises a major amount by weight of said component of an A-B-A block copolymer wherein B is an elastomeric polymer block derived from isoprene and A is a thermoplastic polymer block derived from styrene, said A blocks constituting about 8–35 percent by weight of the block copolymer; and about 125–300 parts per one hundred parts by weight of the elastomeric component of a tackifying component consisting essentially of a blend of normally solid and liquid tackifier resins, the proportion of solid resin to liquid resin in the blend being between about 4 to 1 and 1 to 3, said solid resins being normally friable at about 25° C. and said liquid resins being in a liquid state at about 25° C., and said solid resins consisting essentially of polymerized structures derived from aliphatic dienes and mono-olefins of 5 or 6 carbon atoms, at least 40 percent by weight of said structures being derived from piperylene or from piperylene and isoprene.

2. A pressure-sensitive adhesive composition according to claim 1, wherein said liquid tackifier resins are selected from the group consisting of liquid hydrocarbons, liquid rosin esters and liquid polystyrenes.

3. A pressure-sensitive adhesive composition according to claim 1, wherein said solid tackifier resins have a softening point above about 60° C.

4. A pressure-sensitive adhesive composition according to claim 1, wherein said solid tackifier resins have a number average molecular weight above about 900 and said liquid tackifier resins have a number average molecular weight below about 700.

5. A pressure-sensitive adhesive composition according to claim 1, wherein said liquid tackifier resins also consist essentially of polymerized structures derived from aliphatic dienes and mono-olefins of 5 or 6 carbon atoms, at least 40 percent by weight of said structures being derived from piperylene or from piperylene and isoprene.

* * * * *